(12) United States Patent
Thomas

(10) Patent No.: US 7,490,854 B2
(45) Date of Patent: Feb. 17, 2009

(54) AIR BAG SYSTEM AND METHOD

(75) Inventor: Scott D. Thomas, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 161 days.

(21) Appl. No.: 11/166,747

(22) Filed: Jun. 24, 2005

(65) Prior Publication Data
US 2006/0290118 A1 Dec. 28, 2006

(51) Int. Cl.
*B60R 21/30* (2006.01)

(52) U.S. Cl. .................... 280/739; 280/743.2

(58) Field of Classification Search .......... 280/736, 280/739, 742, 743.2
See application file for complete search history.

(56) References Cited

U.S. PATENT DOCUMENTS

| 6,409,213 | B2 * | 6/2002 | Webber et al. | 280/739 |
| 6,454,300 | B1 * | 9/2002 | Dunkle et al. | 280/742 |
| 6,511,094 | B2 | 1/2003 | Thomas et al. | 280/743.2 |
| 6,830,265 | B2 * | 12/2004 | Ford | 280/739 |
| 6,918,614 | B2 * | 7/2005 | Ryan | 280/743.2 |
| 7,055,856 | B2 * | 6/2006 | Ford et al. | 280/736 |
| 2004/0051285 | A1 | 3/2004 | Fischer | 280/739 |
| 2004/0051286 | A1 | 3/2004 | Fischer et al. | 280/739 |
| 2005/0040634 | A1 | 2/2005 | Braun et al. | 280/742 |
| 2005/0127648 | A1 | 6/2005 | Fischer et al. | 280/739 |

* cited by examiner

*Primary Examiner*—John Q. Nguyen
*Assistant Examiner*—Robert A. Coker

(57) ABSTRACT

An air bag system includes an inflator, an inflatable air bag, an air bag housing substantially surrounding the air bag, and a vent-modifying mechanism operatively connected to the housing. The housing defines a vent. The vent-modifying mechanism includes a vent blocker movable from a first position to a second position to adjust inflation fluid flow through the vent, and a retention member retaining the vent blocker in the first position. A sensing tether extending between the air bag and the retention member is operable to selectively release the retention member. An inflation fluid responsive member movable between a restricting position and an unrestricting position may also be included. The inflation fluid responsive member at least partially blocks the housing vent in the restricting position, and is movable to an unrestricting position in response to pressure of inflation fluid.

13 Claims, 9 Drawing Sheets

FIG. 4
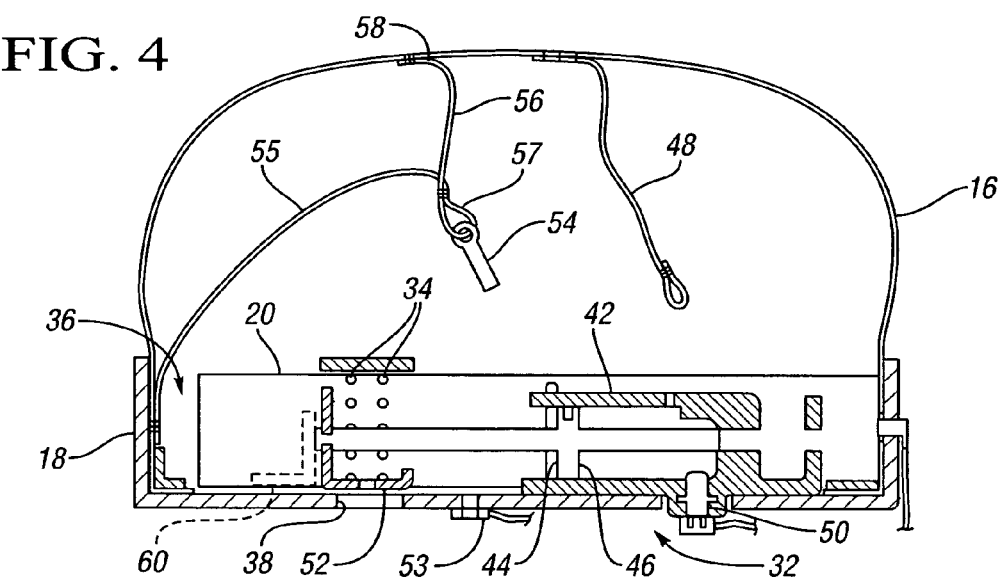
FIG. 5a
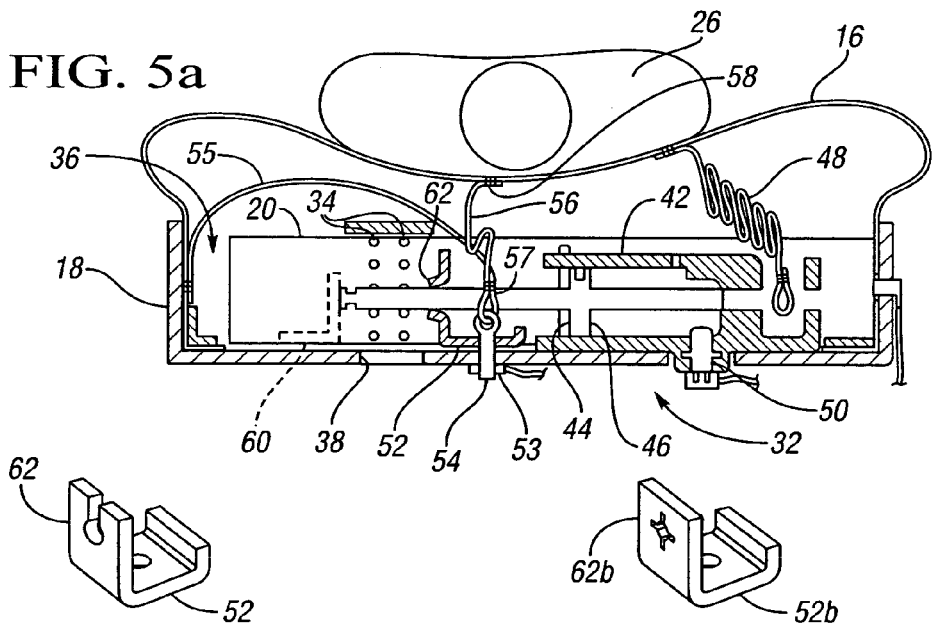
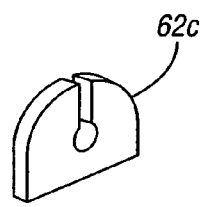
FIG. 5b
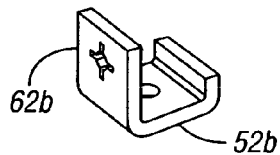
FIG. 5c
FIG. 5d
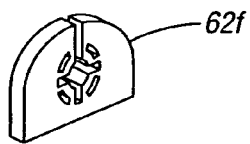
FIG. 5e
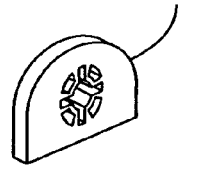
FIG. 5f
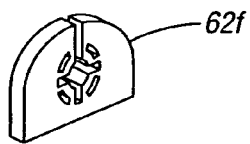
FIG. 5g

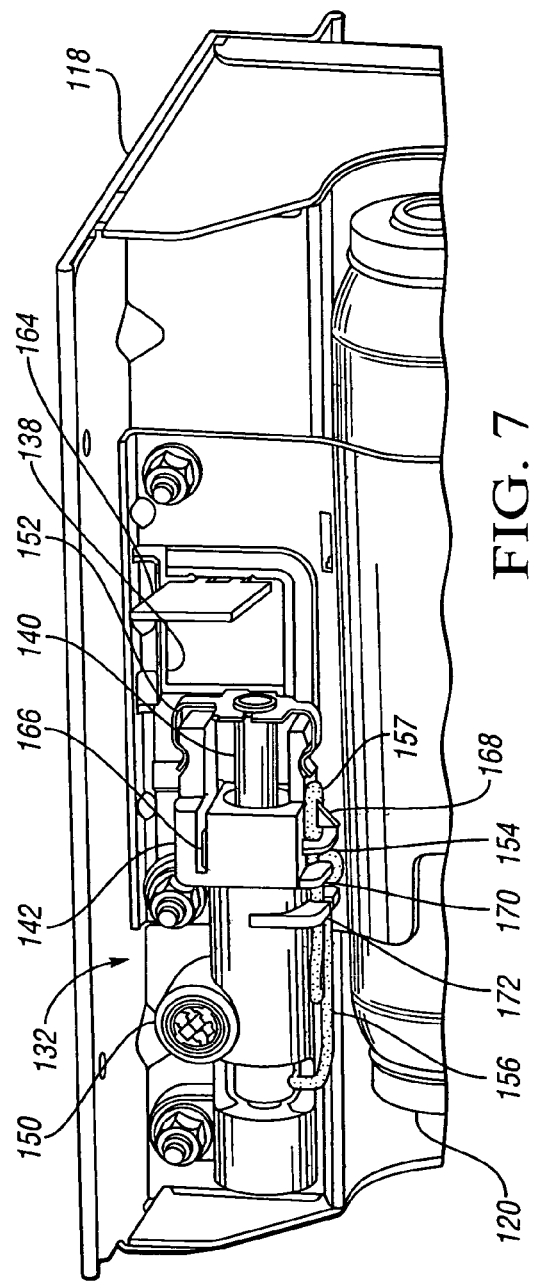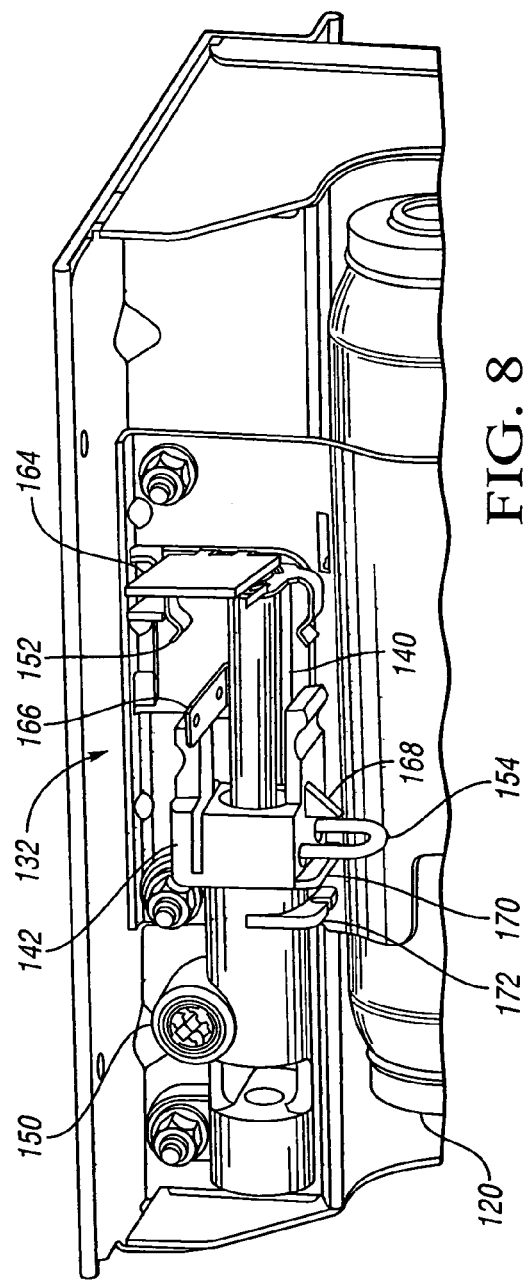

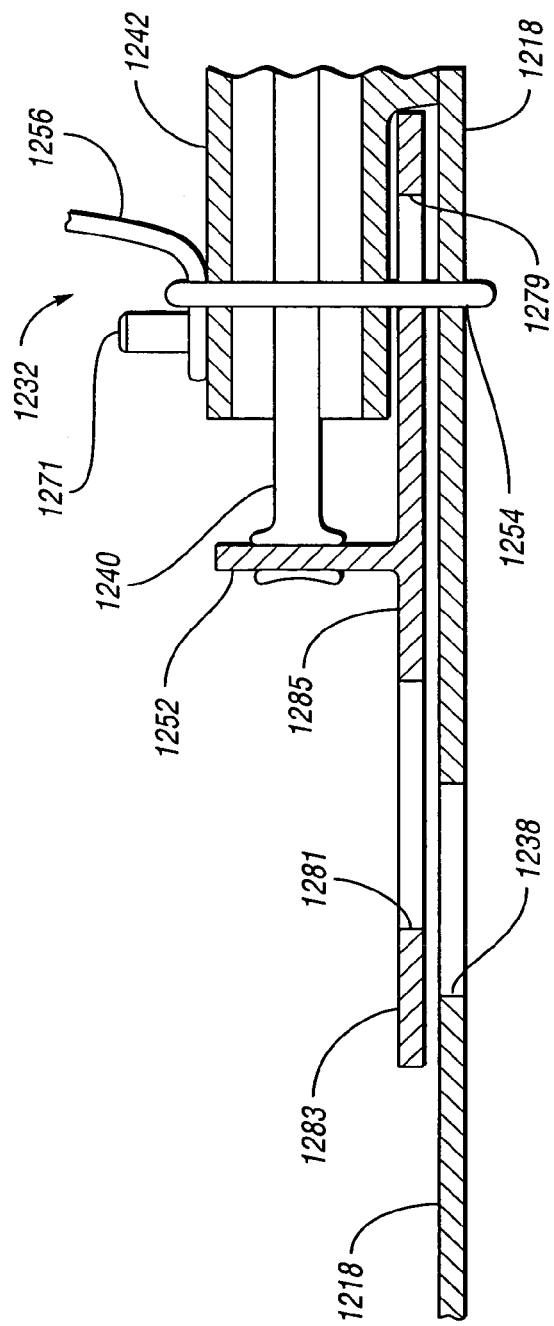
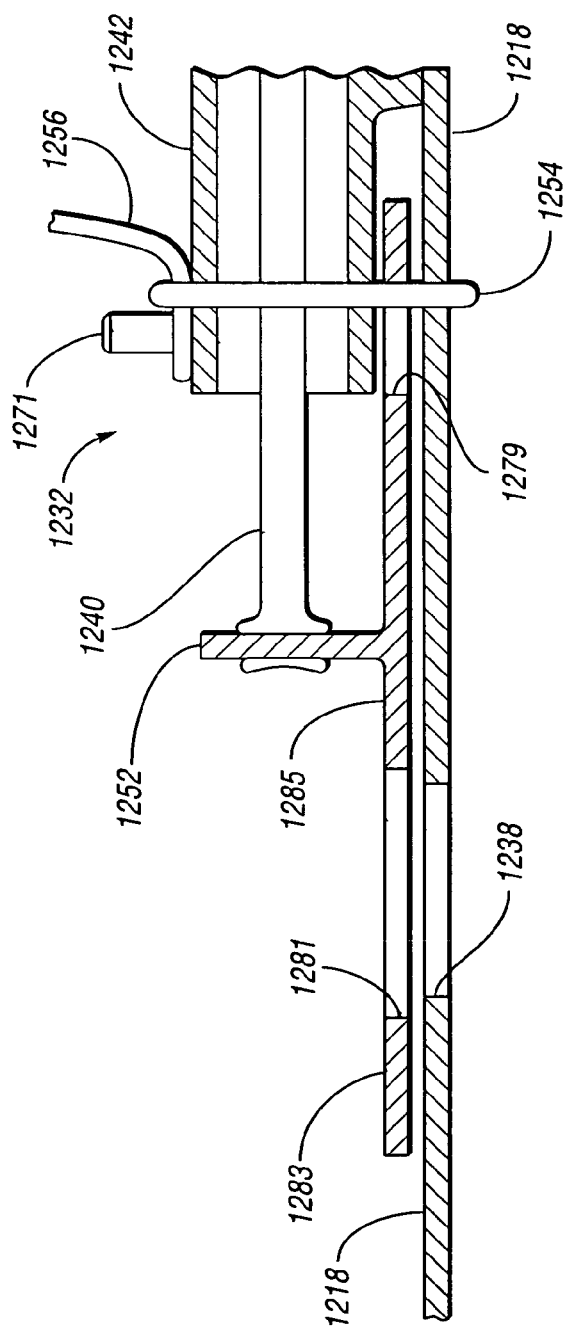

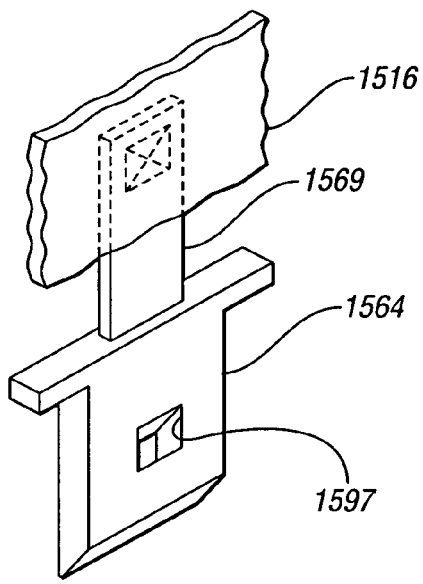
FIG. 24a
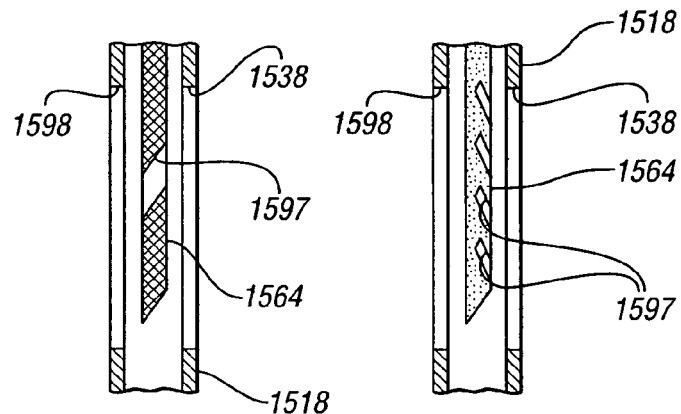
FIG. 24b   FIG. 24c
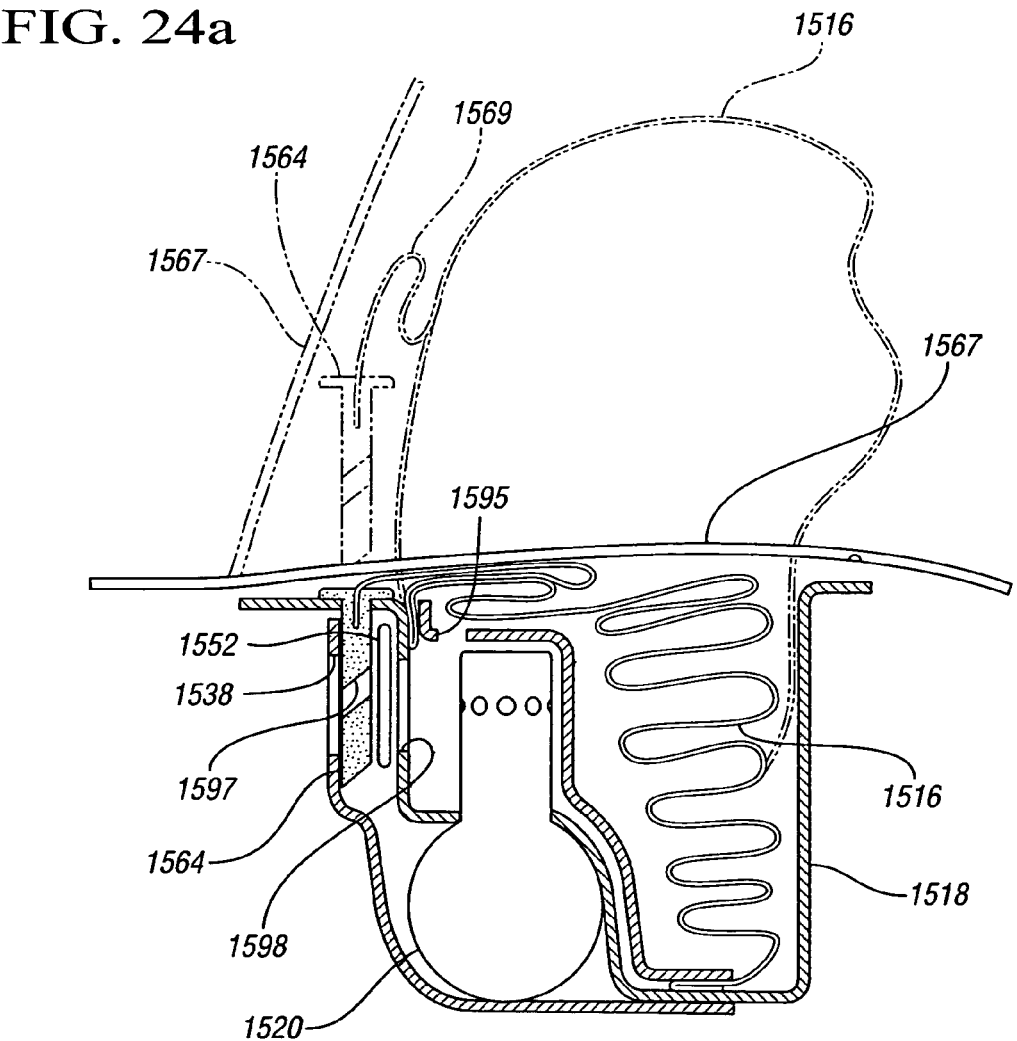
FIG. 25

AIR BAG SYSTEM AND METHOD

TECHNICAL FIELD

This invention relates to an automotive vehicle air bag system, and more particularly to a movable member for assisting in controlling deployment of an air bag.

BACKGROUND OF THE INVENTION

Air bag systems in automotive vehicles generally include an air bag that is designed to deploy within a passenger compartment of the automotive vehicle when triggered by a sensor signal. For example, air bag systems might be deployed upon sudden deceleration of a vehicle or upon impact of the vehicle with another object. The art continues to investigate alternative ways to deploy air bags. For example, accelerometers have been investigated to determine when a sensor signal should signal the deployment of an air bag. Inflator assemblies have been developed to control how much gas is emitted into an air bag upon deployment.

SUMMARY OF THE INVENTION

An air bag system includes an inflator operable to release inflation fluid, an inflatable air bag inflatable upon release of inflation fluid from the inflator, an air bag housing substantially surrounding the air bag, and a vent-modifying mechanism operatively connected to the housing. The housing defines a vent for venting inflation fluid from within the housing. The vent-modifying mechanism includes a vent blocker movable from a first position to a second position to adjust inflation fluid flow through the vent, and a retention member operable to retain the vent blocker in the first position. A flexible sensing tether extends between the air bag and the retention member. The sensing tether is operable to release the retention member to permit movement of the vent blocker from the first position to the second position. In one aspect of the invention, the vent is substantially unblocked when the vent blocker is in the first position, and the vent blocker substantially blocks the vent in the second position. In another aspect of the invention, the vent blocker substantially blocks the vent in the first position, while the vent is substantially unblocked when the vent blocker is in the second position. In still another aspect of the invention, the vent blocker is movable from the first position to a third position intermediate to the first and second positions.

The mechanism may further include a movable member at least partially defining a pressurizable chamber, and an actuator operable to selectively release actuation fluid into the pressurizable chamber to pressurize the pressurizable chamber. Pressurization of the pressurizable chamber preferably moves the movable member from an undeployed state to a deployed state. The movable member may attach to the vent blocker, such that movement of the movable member moves the vent blocker when the retention member is released. Additionally, the vent blocker may include a weakened portion, with the movable member breaking through the weakened portion of the vent blocker during movement of the movable member from the undeployed state to the deployed state when the retention member retains the vent blocker in the first position. The vent blocker may also prevent movement of the movable member from the undeployed state to the deployed state when the retention member retains the vent blocker in the first position. The sensing tether preferably includes a proximal portion attached at the retention member, and a distal portion attached to the air bag. The distal portion may be either directly or indirectly attached to the air bag. If the air bag passes a predetermined plane P, the sensing tether releases the retention member, thereby allowing movement of the vent blocker.

In another aspect of the present invention, an air bag system includes an inflator operable to release inflation fluid, an inflatable air bag inflatable upon release of inflation fluid from the inflator, an air bag housing substantially surrounding the air bag, and an inflation fluid responsive member movable between a restricting position and an unrestricting position. The housing defines a housing vent for venting inflation fluid from within the housing. The inflation fluid responsive member at least partially blocks the housing vent in the restricting position to restrict venting of inflation fluid therethrough. The inflation fluid responsive member is movable from the restricting position to the unrestricting position in response to pressure of inflation fluid to thereby increase venting of inflation fluid from the air bag. The inflation fluid responsive member may pivot, bend, or translate with respect to the housing vent to increase venting of inflation fluid. As another alternative, the inflation fluid response member may include at least one arm extendable in response to pressure of inflation fluid to move the inflation fluid responsive member from the restricting position to the unrestricting position. Additionally, the inflation fluid responsive member may attach directly to the air bag, such that inflation of the air bag at least partially assists in movement of the inflation fluid responsive member from the restricting position to the unrestricting position.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 4 is a schematic partially cross-sectional illustration of the vent-modifying mechanism of FIG. 2 during air bag inflation, with the piston in a deployed state and the vent blocker in a second position;

FIG. 5a is a schematic partially cross-sectional illustration of the vent-modifying mechanism of FIG. 2 during air bag inflation, with the piston in the deployed state and the vent blocker in the first position;

FIG. 5b is a schematic perspective view of a first embodiment of the vent blocker of FIGS. 2 through 5a;

FIG. 5c is a schematic perspective view of a second embodiment of the vent blocker of FIGS. 2 through 5a;

FIG. 5d is a schematic perspective view of a weakened portion of a third embodiment of the vent blocker of FIGS. 2 through 5a;

FIG. 5e is a schematic perspective view of the weakened portion of a fourth embodiment of the vent blocker of FIGS. 2 through 5a;

FIG. 5f is a schematic perspective view of the weakened portion of a fifth embodiment of the vent blocker of FIGS. 2 through 5a;

FIG. 5g is a schematic perspective view of the weakened portion of a sixth embodiment of the vent blocker of FIGS. 2 through 5a;

FIG. 7 is a schematic perspective view of the vent-modifying mechanism of FIG. 6, with the inflation fluid responsive member in an unrestricting position;

FIG. 8 is a schematic perspective view of the vent-modifying mechanism of FIG. 6, with the piston in a deployed state and the vent blocker in a second position;

FIG. 19 is a schematic partially cross-sectional illustration of a sixth embodiment of a vent-modifying mechanism for use with an air bag system such as that of FIG. 1, with a seventh embodiment of a vent blocker in a first position;

FIG. 20 is a schematic cross-sectional illustration of the vent-modifying mechanism of FIG. 19, with the vent blocker in a third position;

FIG. 24a is a schematic perspective view of fifth embodiment of an inflation fluid responsive member;

FIG. 24b is a schematic cross-sectional side view of the inflation fluid responsive member of FIG. 24a;

FIG. 24c is a schematic cross-sectional side view of an alternative configuration of the inflation fluid responsive member of FIG. 24a; and FIG. 25 is a schematic partially cross-sectional view of an air bag system incorporating the inflation fluid responsive member of FIG. 24a.

DESCRIPTION OF THE PREFERRED EMBODIMENTS

Figure 1:
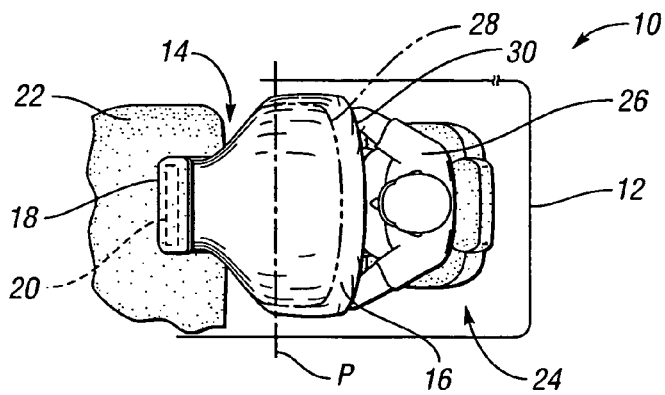
FIG. 1 is a schematic plan view illustration of an air bag system mounted to a vehicle.

Referring to the drawings, wherein like reference numbers refer to like components, FIG. 1 shows a vehicle 10 having a vehicle body 12. An air bag system 14 is mounted to the vehicle 10. The air bag system includes an air bag 16 connected to an air bag housing 18. An inflator 20 is mounted within the housing 18. The housing 18 is mounted within an instrument panel 22, although it may be mounted elsewhere on the vehicle 10 within the scope of the invention. The air bag 16 is selectively deployable into an interior space 24 toward an occupant 26 upon release of inflation gas by the inflator 20. The air bag 16 may be inflatable when deployed to either a shallow first profile 28 or a deeper second profile 30 as known in the art. Sensors (not shown) mounted to the vehicle 10 may be connected in signaling communication with the inflator 20, as known to those skilled in the art. Under certain sensed conditions, the sensors signal the inflator 20 to release inflation fluid, thereby inflating the air bag 16.

A predetermined plane P is shown in FIG. 1. The purpose of the predetermined plane P will become more apparent below. The predetermined plane P may be chosen anywhere within the vehicle interior space 24 between the air bag housing 18 and the first profile 28. For ease of explanation, each reference to "the predetermined plane P of FIG. 1" and "the predetermined plane P" used herein refer to the predetermined plane P shown in FIG. 1.

Figure 2:
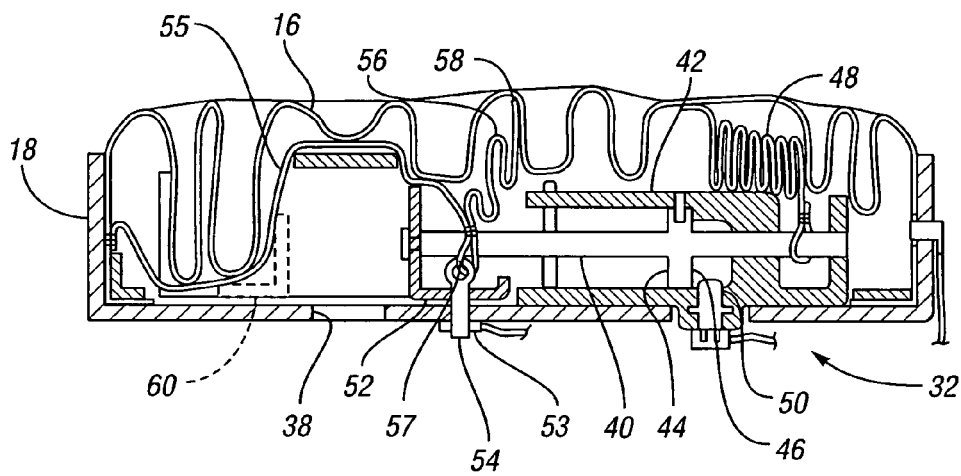
FIG. 2 is a schematic cross-sectional illustration of a first embodiment of a vent-modifying mechanism used in an air bag system such as that of FIG. 1 prior to inflation of an air bag, with a piston in an undeployed state, a vent blocker in a first position, and a first embodiment of a retention member.

Referring now to FIG. 2, a first embodiment of a vent-modifying mechanism is generally shown at 32. As shown in FIG. 2, the mechanism 32 is substantially contained within the housing 18. However, the mechanism 32 may be disposed outside of the housing 18 without changing the inventive concept. The mechanism 32 can be attached to the housing 18 with threaded fasteners, or by a variety of other attachment means readily understandable to those skilled in the art. As better shown in FIG. 3, the inflator 20 is also mounted within the housing 18. The inflator 20 releases inflation fluid from inflator ports 34 into a housing interior space 36. A vent 38 enables inflation fluid released from the inflator 20 to pass from the housing interior space 36 to surrounding atmosphere, thereby affecting the inflation and deflation (i.e. ridedown) of the air bag 16 of FIG. 1.

Figure 3:
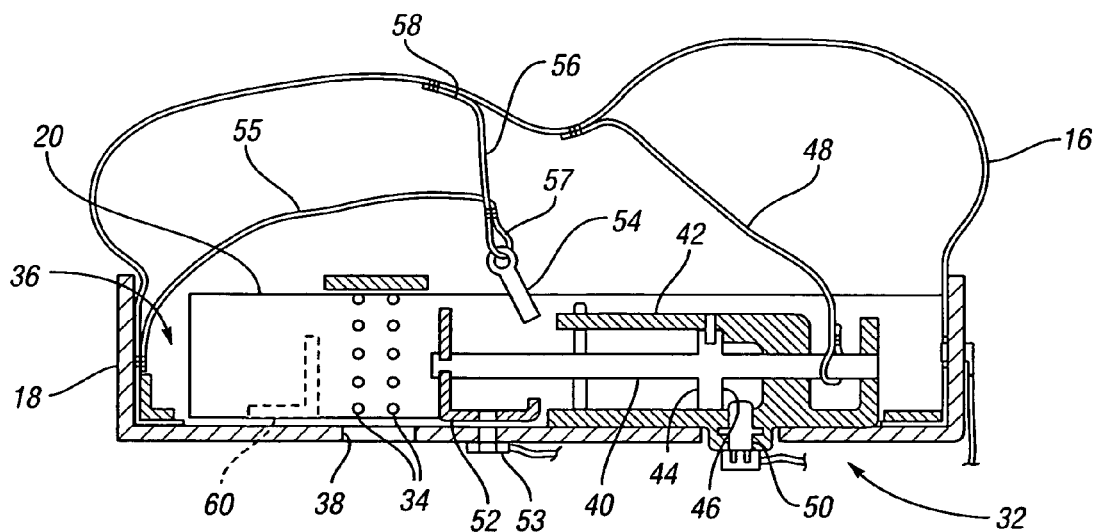
FIG. 3 is a schematic partially cross-sectional illustration of the vent-modifying mechanism of FIG. 2 during air bag inflation, with the piston in the undeployed state and the vent blocker in the first position.

The mechanism 32 includes a piston 40 slidable within a piston housing 42 from an undeployed state, as shown in FIGS. 2 and 3, to a deployed state, as shown in FIG. 4. The piston 40 thus comprises a movable member in this embodiment and all others where a piston is utilized. The piston 40 includes a sealing portion 44, with a portion of the piston housing 42 and the sealing portion 44 defining a pressurizable chamber 46. An actuator 50 extends into the pressurizable chamber 46. The actuator 50 releases actuation fluid into the pressurizable chamber 46 upon detection of sensed conditions. One such actuator 50 is a pyrotechnic device, such as a container of solid propellant, wherein the propellant is conventionally ignited by an electrical signal, such as a signal from a sensor, to actuate the actuator 50. Upon actuation, pressure builds within the pressurizable chamber 46 to move the piston 40 from the undeployed state to the deployed state. The conditions causing the actuator 50 to actuate may include impact speed, weight of the occupant, sensed seat or occupant position, etc. Each of these conditions may be determined with sensors in signaling communication with the actuator 50. A profile restraining tether 48 preferably loops around the piston 40, as shown in FIGS. 2 and 3. When the piston 40 moves to the deployed state, the profile restraining tether 48 is released.

The piston 40 attaches to a vent blocker 52. In FIGS. 2 and 3, the vent blocker 52 is shown in a first position, wherein the vent blocker 52 does not substantially block the vent 38, thereby allowing a significant portion of the inflation fluid from the inflator 20 to pass into the surrounding atmosphere. FIG. 4 shows the vent blocker 52 in a second position, wherein the vent blocker 52 substantially blocks the vent 38, thereby restricting most, if not all, inflation fluid flow therethrough. It should be noted that the vent blocker 52 could substantially block the vent 38 in the first position and not substantially block the vent 38 in the second position without changing the inventive concept. Additionally, the vent blocker 52 need not fully block or fully unblock the vent 38 in either position to practice the present invention. Those skilled in the art will readily understand that the vent blocker 52 may be positioned differently with respect to the vent 38 without changing the inventive concept.

The mechanism 32 further includes a retention member 54 that retains the vent blocker 52 in the first position. FIG. 2 shows a first embodiment of the retention member 54, which is a pin extending through the vent blocker 52. The retention member 54 optionally extends through a sensor 53 for detecting whether the retention member 54 is in place. The retention member 54 may include a bend or a notch (not shown), which interfaces with one or more of the piston 40, the vent blocker 52, and the housing 18 to retain the retention member 54 prior to deployment of the air bag 16. A sensing tether 56 includes a proximal portion 57 engaging the retention member 54, and a distal portion 58 attached to an inner face of the air bag 16. In the preferred embodiment, the distal portion 58 of the sensing tether 56 attaches directly to the inner face of the air bag 16, as shown in FIG. 2. However, the sensing tether 56 could also be indirectly attached to the inner face of the air bag 16. As one example, the sensing tether 56 could attach to the profile restraining tether 48, with the profile restraining tether 48 attaching to the inner face of the air bag 16. Preferably, the proximal portion 57 of the sensing tether 56 forms a loop, with the loop passing through the retention member 54, such that the proximal portion 57 of the sensing tether 56 engages the retention member 54 by attaching directly thereto. However, the proximal portion 57 could engage the retention member 54 in a plurality of ways. As one example, the proximal portion 57 could include a knot, with the sensing tether 56 routed beneath the retention member 54. Since the knot is unable to slip beneath the retention member 54, the retention member 54 holds the sensing tether 56 in position. This configuration would be particularly useful with a U-shaped retention member 54. Instead of a knot, a solid retention feature could also be attached to the proximal portion 57 and achieve the same outcome.

Prior to inflation of the air bag 16, the sensing tether 56 is substantially slack, as shown best in FIG. 2. As the air bag 16 inflates and moves away from the mechanism 32, as shown in FIG. 3, the sensing tether 56 is pulled taut to reduce the slack therein. The sensing tether 56 has a length such that the sensing tether is fully taut when any portion of the air bag 16 reaches the predetermined plane P of FIG. 1. If any portion of the air bag 16 passes the predetermined plane P, the sensing tether 56 pulls the retention member 54 out of the vent blocker 52. Preferably, a retention tether 55 controls movement of the retention member 54 within the air bag 16 to prevent potential damage thereto. As another alternative, the air bag housing 18 may include a wall (not shown) to restrict travel of the retention member 54. If the retention member 54 has been released, the vent blocker 52 is free to move to the second position upon deployment of the piston 40. In the second position, the vent blocker 52 preferably substantially covers the vent 38, thereby restricting most if not all inflation fluid therethrough. If the air bag 16 does not pass the predetermined plane P, the sensing tether 56 will not pull the retention member 54 from the vent blocker 52. Instead, the retention member 54 will keep the vent blocker 52 in the first position, even if the piston 40 is deployed. Thus, the predetermined plane P is defined as the plane the air bag 16 must pass during inflation in order for vent blockage to occur.

The actuator 50 is preferably also actuatable to deploy the air bag 16 to the second profile 30, as shown in FIG. 1, rather than the first profile 28, also shown in FIG. 1, in response to the sensed condition or conditions. The air bag depth (profile 28 or 30) commensurate with the sensed conditions will be substantially achieved if the air bag 16 has passed the predetermined plane P, thereby allowing the vent blocker 52 to move with the piston 40 (since the retention member 54 has been pulled). Generally, since the first profile 28 is shallower than the second profile 30, more venting of inflation fluid must occur. Therefore, if the first profile 28 is commanded, a controller (not shown) inhibits or significantly delays actuation of the actuator 50 to thereby delay or prevent deployment of the piston 40, and thus the attached vent blocker 52, thereby allowing some or all of the inflation fluid to dissipate through the vent 38 prior to vent blockage. Alternatively, if the second profile 30 is commanded, the actuator 50 will be actuated early during deployment, thus moving the piston 40 and attached vent blocker 52 sooner to allow less, if any, inflation fluid to dissipate through the vent 38 prior to vent blockage.

If the air bag 16 does not pass the predetermined plane P, the retention member 54 is not removed from the vent blocker 52, such that the vent blocker 52 remains in the first position even if the actuator 50 deploys the piston 40. FIG. 5*a* illustrates this situation. The vent blocker 52 preferably includes a weakened portion 62, which allows the piston 40 to pass through the vent blocker 52 when the actuator 50 deploys the piston 40, but the air bag 16 has not passed the predetermined plane P. The piston 40 thus passes through the vent blocker 52, and preferably terminates motion at a stop 60. The stop 60 also impedes movement of the vent blocker 52 as necessary to ensure the vent blocker 52 covers the vent 38. Alternatively, the sealing portion 44 of the piston 40 may act as a stop upon contact with a portion of the piston housing 42, as shown in FIG. 4. As another alternative, the retention member 54 may act as a stop by coming in contact with the sealing portion 44 of the piston 40.

FIG. 5b shows a first embodiment of the vent blocker 52 in more detail. In the first embodiment 52, the weakened portion 62 includes an opening for receiving the piston 40, with a slot extending upward from the opening. FIG. 5c shows a second embodiment of a vent blocker 52b, wherein a weakened portion 62b includes a plurality of slots surrounding an opening for receiving the piston 40. FIG. 5d shows a weakened portion 62c including an opening for receiving the piston 40 with a slot extending upward from the opening, with the weakened portion 62c having a rounded profile. FIG. 5e shows a weakened portion 62d including a plurality of slots extending from an opening for receiving the piston 40, with the weakened portion 62d having a rounded profile. FIG. 5f shows a weakened portion 62e including a plurality of slots extending from an opening for receiving the piston 40, with a second set of slots disposed between the plurality of slots and radially surrounding the opening. FIG. 5g shows a weakened portion 62f including a plurality of slots extending from an opening for receiving a piston, a second set of slots disposed between the plurality of slots and radially surrounding the opening, with one slot of the second set of slots extending upward from the opening. While FIGS. 5b through 5g show different configurations that may be used for the weakened portion 62 of the vent blocker 52, it should be noted that the vent blocker 52 may include a weakened portion 62 other than as specifically indicated herein. Additionally, the weakened portion 62 may be disposed on the piston 40, or both the vent blocker 52 and the piston 40. As yet another alternative, the vent blocker 52 may be designed to sufficiently oppose a force exerted by the piston 40 upon actuation of the actuator 50, such that actuation of the actuator 50 does not move the vent blocker 52 unless the retention member 54 has been released. In this case, actuation fluid released by the actuator 50 would likely dissipate through spaces between the components forming the pressurizable chamber 46, including any seals (not shown). To practice the present invention, it matters only that the sensing tether 56 allows actuation of the actuator without affecting the vent 38 when desired.

Figure 6:
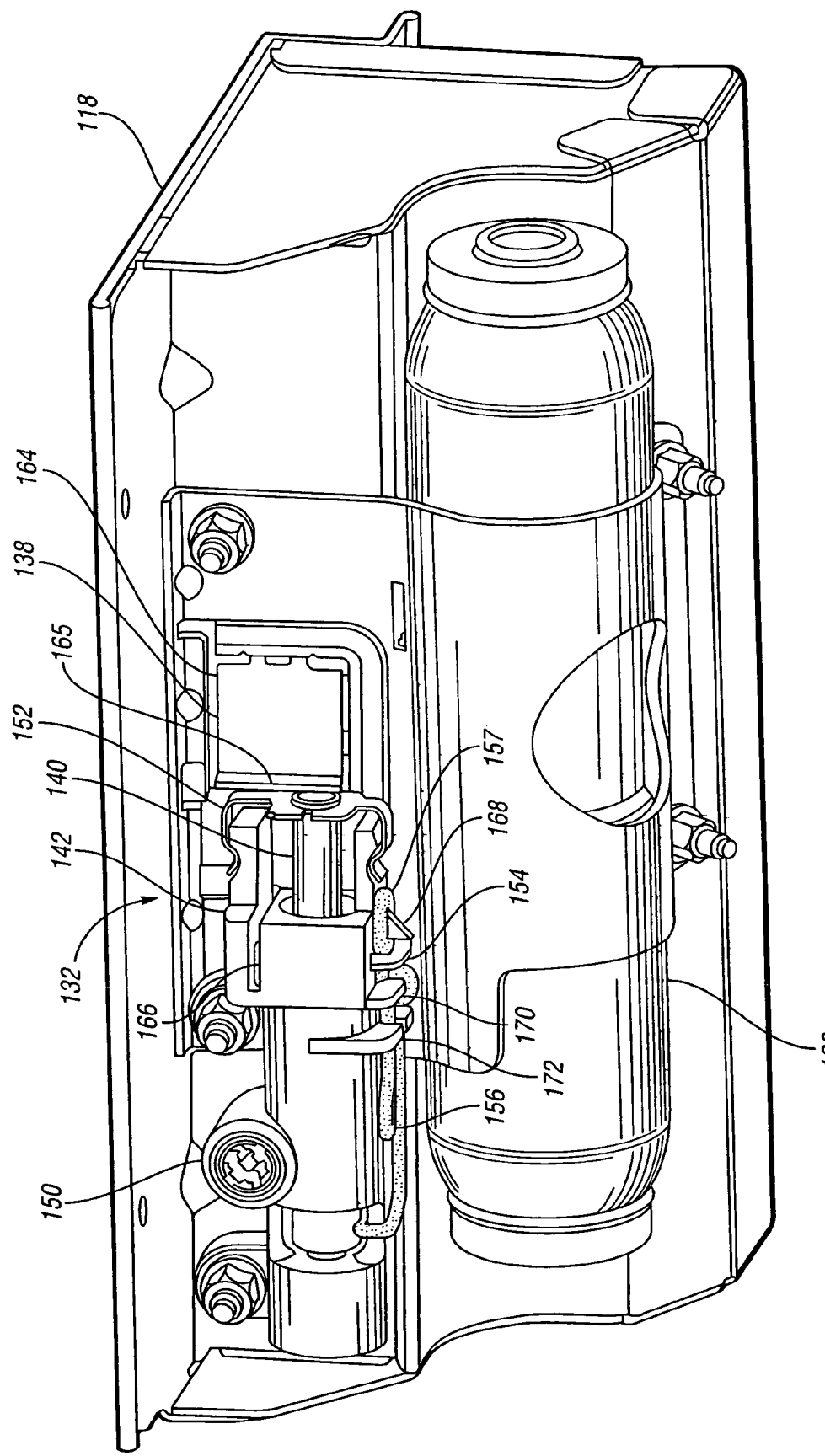
FIG. 6 is a schematic perspective view of a second embodiment of a vent-modifying mechanism used in an air bag system such as that of FIG. 1, with a piston in an undeployed state, a vent blocker in a first position, an inflation fluid responsive member in a restricting position, and a second embodiment of a retention member.

FIGS. 6 through 8 show a second, preferred embodiment of a vent-modifying mechanism generally shown at 132, wherein the mechanism 132 is disposed outside of an air bag housing 118. The mechanism 132 can be attached to the air bag housing 118 with threaded fasteners, as shown, or by any other attachment means known by one skilled in the art. An inflator 120 releases inflation fluid into the air bag housing 118 to inflate an air bag (not shown, but generally packaged within the air bag housing 118). A vent 138 allows inflation fluid to exit the air bag housing 118 into the surrounding atmosphere, thereby affecting the inflation and deflation of the air bag. The vent 138 includes an inflation fluid responsive member 164 pivotal with respect to the air bag housing 118. A first embodiment of an inflation fluid responsive member 164 covers the vent 138, thereby assisting in retaining inflation fluid within the air bag housing 118. In this embodiment 132, the inflation fluid responsive member 164 is a door hingedly attached with respect to the air bag housing 118. However, in general, the inflation fluid responsive member 164 is a member configured to selectively restrict venting of inflation fluid, which is movable between a restricting position and an unrestricting position in response to inflation fluid pressure. If enough inflation fluid builds up within the housing 118, the inflation fluid responsive member 164 pivots from a restricting position, shown in FIG. 6, to an unrestricting position, shown in FIGS. 7 and 8, thereby uncovering the vent 138 to allow inflation fluid to exit the air bag housing 118 therethrough.

The mechanism 132 includes a piston 140 slidable within a piston housing 142 from an undeployed state, as shown in FIGS. 6 and 7, to a deployed state, shown in FIG. 8. An actuator 150 ignites to move the piston 140 from the undeployed state to the deployed state in response to sensed conditions as described with respect to the first embodiment of the mechanism 32. The piston 140 attaches to a vent blocker 152. In FIGS. 6 and 7, the vent blocker 152 is shown in a first position, wherein the vent blocker 152 does not block the vent 138, thereby allowing inflation fluid from the inflator 120 to pass to the surrounding atmosphere once the inflation fluid responsive member 164 rotates to uncover the vent 138. FIG. 8 shows the vent blocker 152 in a second position, wherein the vent blocker 152 covers the vent 138, thereby retaining inflation fluid within the housing 118. The inflation fluid responsive member 164 preferably pivots to the unrestricting position prior to movement of the vent blocker 152, as shown in FIG. 7. However, the inflation fluid responsive member 164 may include a flange 165 (shown in FIG. 6), with the vent blocker 152 engaging the flange 165 to push the inflation fluid responsive member 164 to the unrestricting position as the vent blocker 152 moves to the second position.

The mechanism 132 further includes a second embodiment of a retention member 154 that retains the vent blocker 152 in the first position. The second embodiment of a retention member 154 is a U-shaped pin extending through the piston housing 142 and a plate 166 integral with the vent blocker 152. A sensing tether 156 includes a proximal portion 157 routed from within the air bag housing 118 and extending through the retention member 154, and around a ramp 168 on the piston housing 142. The sensing tether 156 may also be directed over flange 170 on the piston housing 142 and through an extension 172 on the air bag housing 118, as shown in FIGS. 6 through 8, to better direct the sensing tether 156 during air bag inflation. A distal portion (not shown) of the sensing tether 156 attaches to an inner face of an air bag (not shown) as described with respect to the first embodiment of the mechanism 32. The majority of the sensing tether 156 may be located inside the housing 118, outside the housing 118, or both. As an option, the sensing tether 156 may be wrapped back and forth and covered with a frangible sleeve, such as a paper sleeve, to retain the sensing tether 156 prior to deployment of the air bag. As the air bag inflates and moves away from the mechanism 132, the sensing tether 156 is pulled taut. If the air bag passes the predetermined plane P of FIG. 1, the sensing tether 156 slides over the ramp 168, and pulls the retention member 154 out of the plate 166 and at least partially out of the piston housing 142, thereby freeing the vent blocker 152 for movement to the second position upon actuation of the actuator 150.

Figure 9:
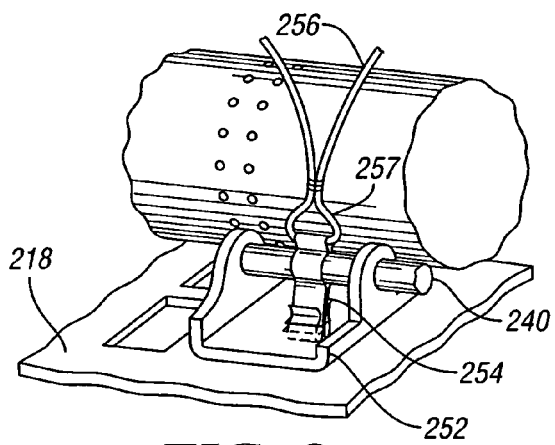
FIG. 9 is a schematic perspective view of a third embodiment of a retention member for use with the vent-modifying mechanism of the present invention.

FIGS. 9 through 15 show various embodiments of retention members for use with any of the embodiments of the mechanism described herein. FIG. 9 shows a third embodiment of a retention member 254, which is a clip surrounding a piston 240, and extending through a vent blocker 252 and an air bag housing 218. When the retention member 254 is in place, movement of the vent blocker 252 is restricted. A proximal portion 257 of a sensing tether 256 extends through the retention member 254. A distal portion (not shown) of the sensing tether 256 attaches to an inner face of an air bag (not shown) as described with respect to the first embodiment of the mechanism 32. If the air bag passes the predetermined plane P of FIG. 1 during inflation, the sensing tether 256 pulls the retention member 254 out of the air bag housing 218 and the vent blocker 252, thereby allowing the vent blocker 252 to move.

Figure 10:
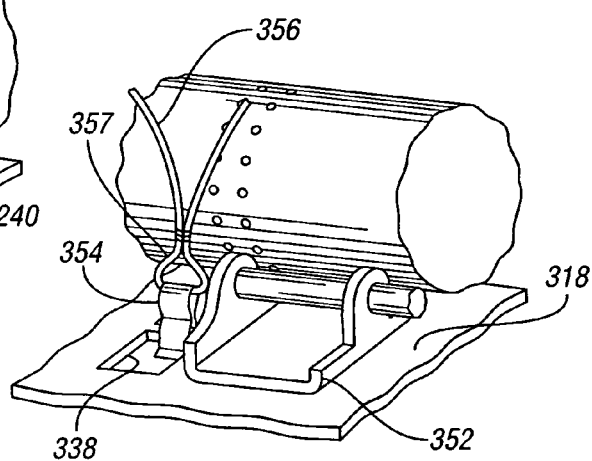
FIG. 10 is a schematic perspective view of a fourth embodiment of a retention member for use with the vent-modifying mechanism of the present invention.

FIG. 10 shows a fourth embodiment of a retention member 354, which is a clip attaching to a portion of an air bag housing 318 between two vents 338. When the retention member 354 is in place, a vent blocker 352 cannot fully cover the vent 338. A proximal portion 357 of a sensing tether 356 extends through the retention member 354. A distal portion (not shown) of the sensing tether 356 attaches to an inner face of an air bag (not shown). If the air bag passes the predetermined plane P of FIG. 1 during inflation, the sensing tether 356 pulls the retention member 354 off of the portion of the air bag housing 318 to which it is attached, thereby allowing the vent blocker 352 to move.

Figure 11:
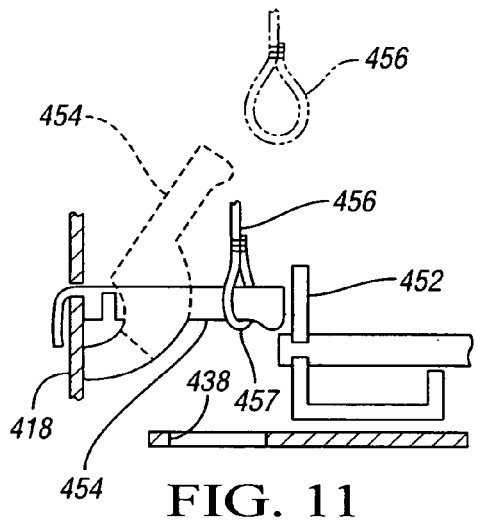
FIG. 11 is a schematic cross-sectional view of a fifth embodiment of a retention member for use with the vent-modifying mechanism of the present invention.

FIG. 11 shows a fifth embodiment of a retention member 454, which is an arm attached to an air bag housing 418 and pivotal from an obstructing position to an unobstructing position (shown in phantom in FIG. 11). A proximal portion 457 of a sensing tether 456 extends around a portion of the retention member 454. A distal portion (not shown) of the sensing tether 456 attaches to an inner face of an air bag (not shown). If the air bag passes the predetermined plane P of FIG. 1, the sensing tether 456 pulls the retention member 454, thereby pivoting the retention member 454 from the obstructing position to the unobstructing position. When the retention member 454 is in the unobstructing position, a vent blocker 452 can move from a first position to a second position to cover a vent 438.

Figure 12:
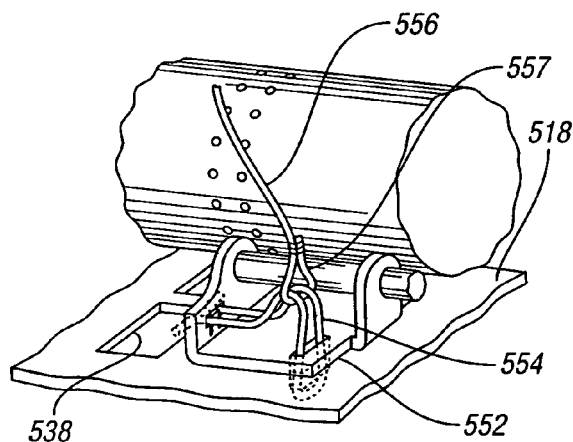
FIG. 12 is a schematic perspective view of a sixth embodiment of a retention member for use with the vent-modifying mechanism of the present invention.

FIG. 12 shows a sixth embodiment of a retention member 554, which is an arm extending through a vent blocker 552 and an air bag housing 518. A proximal portion 557 of a sensing tether 556 extends around a portion of the retention member 554. A distal portion (not shown) of the sensing tether 556 attaches to an inner face of an air bag (not shown). If the air bag passes the predetermined plane P of FIG. 1, the sensing tether 556 pulls and pivots the retention member 554, thereby disengaging the retention member 554 from the vent blocker 552 and the air bag housing 518. The vent blocker 552 is then free to move from a first position to a second position to cover a vent 538.

Figure 13:
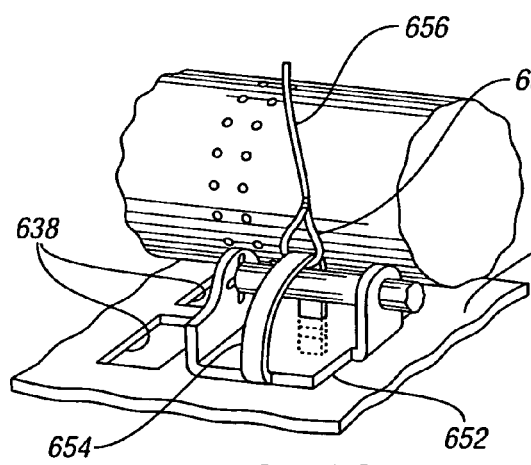
FIG. 13 is a schematic perspective view of a seventh embodiment of a retention member for use with the vent-modifying mechanism of the present invention.

FIG. 13 shows a seventh embodiment of a retention member 654, which is integral with a vent blocker 652. The retention member 654 extends through the vent blocker 652 and an air bag housing 618. A proximal portion 657 of a sensing tether 656 extends around the retention member 654. A distal portion (not shown) of the sensing tether 656 attaches to an inner face of an air bag (not shown). If the air bag passes the predetermined plane P of FIG. 1, it pulls the retention member 654 out of the vent blocker 652 and the air bag housing 618. The vent blocker 652 is then free to move from a first position to a second position to cover a vent 638.

Figure 14:
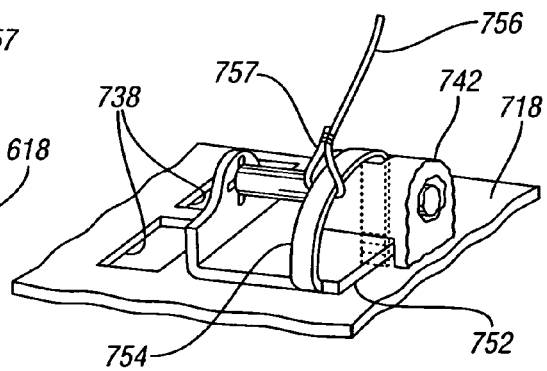
FIG. 14 is a schematic perspective view of an eighth embodiment of a retention member for use with the vent-modifying mechanism of the present invention.

FIG. 14 shows an eighth embodiment of a retention member 754, which is also integral with a vent blocker 752. The retention member 754 extends through a piston housing 742, the vent blocker 752, and an air bag housing 718. A proximal portion 757 of a sensing tether 756 loops around the retention member 754. A distal portion (not shown) of the sensing tether 756 attaches to an inner face of an air bag (not shown). If the air bag passes the predetermined plane P of FIG. 1, it pulls the retention member 754 out of the piston housing 742, the vent blocker 752, and the air bag housing 718. The vent blocker 752 is then free to move from a first position to a second position to cover a vent 738.

Figure 15:
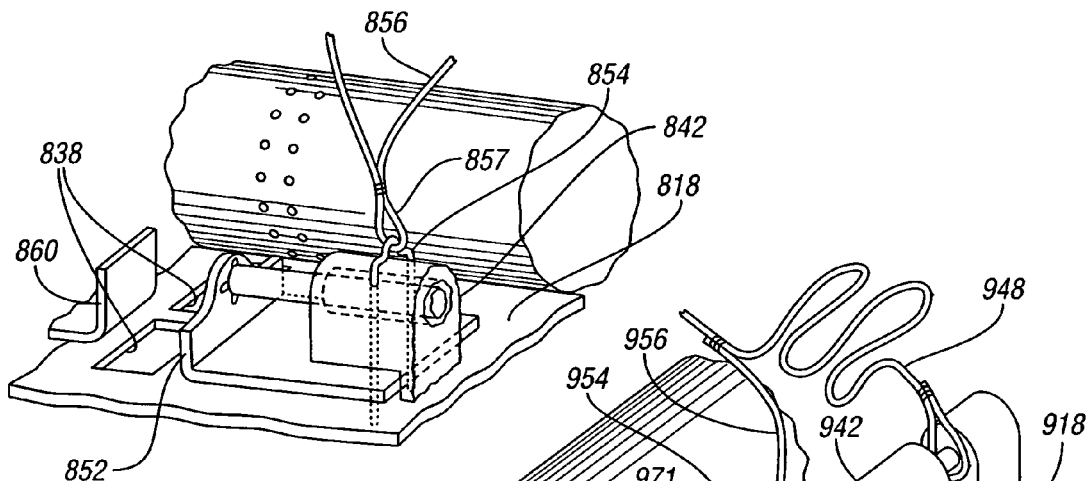
FIG. 15 is a schematic perspective view of a ninth embodiment of a retention member for use with the vent-modifying mechanism of the present invention.

FIG. 15 shows a ninth embodiment of a retention member 854, which is a U-shaped pin extending through a piston housing 842, a vent blocker 852, and an air bag housing 818. A proximal portion 857 of a sensing tether 856 loops around the retention member 854. A distal portion (not shown) of the sensing tether 856 attaches to an inner face of an air bag (not shown). If the air bag passes the predetermined plane P of FIG. 1, the sensing tether 856 pulls the retention member 854 out of the piston housing 842, the vent blocker 852, and the air bag housing 818, thereby freeing the vent blocker 852 to move from a first position to a second position to cover a vent 838.

Figure 16:
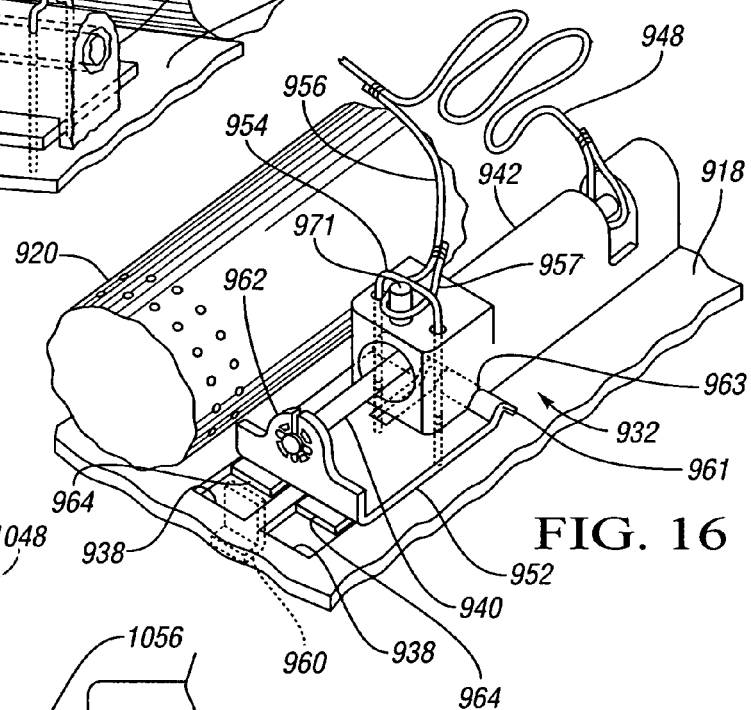
FIG. 16 is a schematic perspective illustration of a third embodiment of a vent-modifying mechanism used in an air bag system such as that of FIG. 1, with a tenth embodiment of a retention member and a second embodiment of an inflation fluid responsive member.

FIG. 16 shows a third embodiment of a vent-modifying mechanism 932, wherein the mechanism 932 is disposed inside of an air bag housing 918. An inflator 920 releases inflation fluid into an air bag housing 918 to inflate an air bag (not shown). Two vents 938 allow inflation fluid to exit the air bag housing 918 into the surrounding atmosphere, thereby affecting the inflation and deflation of the air bag. The vents 938 include a second embodiment of an inflation fluid responsive member 964 in the form of flaps bendable with respect to the air bag housing 918, with one flap at least partially covering each vent. The inflation fluid responsive members 964 initially restrict fluid flow out of the vents 938. Upon actuation of the inflator 920, inflation fluid enters the air bag housing 918 to increase the pressure within the air bag housing 918. If enough inflation fluid builds up with the air bag housing 918, the inflation fluid responsive members 964 preferably bend out of the way, thereby increasing fluid flow through the vents 938. Adjusting the geometry of the inflation fluid responsive members 964 will adjust the amount of initially restricted fluid flow through the vents 938. The inflation fluid responsive members 964 may be integral with the air bag housing 918, or they may be separate parts.

The mechanism 932 includes a piston 940 slidable within a piston housing 942 from an undeployed state to a deployed state in response to sensed conditions as described with respect to the first embodiment of the mechanism 32. The piston 940 attaches to a vent blocker 952. A retention member 954, in this case a U-shaped pin extending through the piston housing 942, the vent blocker 952, and the air bag housing 918, retains the vent blocker 952 in a first position. A sensing tether 956 and a profile restraining tether 948 control air bag deployment. The retention member 954 retains a proximal portion 957 of the sensing tether 956 around a post 971. The post 971 could also be a ramp. A distal portion (not shown) of the sensing tether 956 attaches to an inner face of an air bag (not shown) as described with respect to the first embodiment of the mechanism 32. The distal portion of the sensing tether 956 may also attach to the profile restraining tether 948, which is in turn attached to the inner face of the air bag. As the air bag inflates and moves away from the mechanism 932, the sensing tether 956 is pulled taut. If the air bag passes the predetermined plane P of FIG. 1, the sensing tether 956 pulls the retention member 954 out of at least a portion of the piston housing 942, the vent blocker 952, and the air bag housing 918, thereby freeing the vent blocker 952 for movement to a second position upon actuation of an actuator. The vent blocker 952 preferably includes a weakened portion 962, such that movement of the piston 940 does not necessarily move the vent blocker 952. A stop 960 terminates motion of the piston 940 and the vent blocker 952 such that the vent blocker 952 rests over the vents 938. The vent blocker 952 may include a ridge 961 corresponding to a notch 963 on the piston housing 942 to assist in retaining the vent blocker 952 in the first position.

Figure 17:
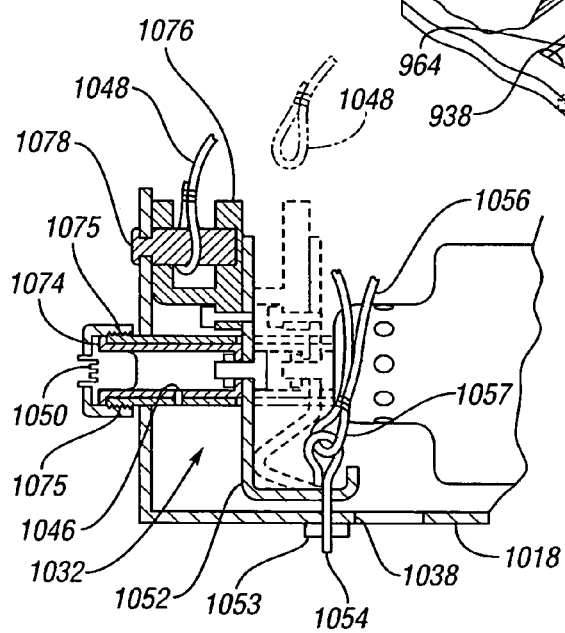
FIG. 17 is a schematic partially cross-sectional illustration of a fourth embodiment of a vent-modifying mechanism for use with an air bag system such as that of FIG. 1.

FIG. 17 illustrates a cross-sectional view of a fourth embodiment of a vent-modifying mechanism, generally shown at 1032. The mechanism 1032 includes an actuator 1050 extending into a pressurizable chamber 1046 at least partially defined by a plunger 1074. The plunger 1074 constitutes the movable member in this embodiment, and in each embodiment utilizing a plunger. The actuator 1050 releases actuation fluid into the pressurizable chamber 1046 upon detection of sensed conditions. Upon actuation, pressure builds within the pressurizable chamber 1046 to move the plunger 1074 along walls 1075 from an undeployed state to a deployed state (shown in phantom in FIG. 17). The plunger 1074 attaches to a vent blocker 1052 movable to a second position to block a vent 1038. A retention member 1054, in this case a pin, extends through the vent blocker 1052, and optionally through a sensor 1053, thereby retaining the vent blocker 1052 in a first position. A proximal portion 1057 of a sensing tether 1056 hooks around the retention member 1054, while a distal portion (not shown) of the sensing tether 1056 attaches to an inner face of an air bag (not shown). As the air bag inflates and moves away from the mechanism 1032, the sensing tether 1056 is pulled taut. If the air bag passes the predetermined plane P of FIG. 1, the sensing tether 1056 pulls the retention member 1054 out of the vent blocker 1052, thereby freeing the vent blocker 1052 for movement to the second position upon actuation of the actuator 1050.

In this embodiment 1032, the vent blocker 1052 may include a weakened portion as described with respect to other embodiments. However, if the retention member 1054 is not released, the vent blocker 1052 may also deform, as shown in phantom in FIG. 17, thereby not covering the vent 1038. Alternatively, the vent blocker 1052 may be designed to sufficiently oppose the force exerted by the plunger 1074 upon actuation of the actuator 1050, such that actuation of the actuator 1050 does not move the vent blocker 1052 unless the retention member 1054 has been released. In this case, actuation fluid released by the actuator 1050 would likely dissipate through spaces within the pressurizable chamber 1046. The mechanism 1032 also includes a profile restraining member 1076 attached to the vent blocker 1052. If the retention member 1054 has been released, the profile restraining member 1076 will move along with the vent blocker 1052, thereby releasing a profile restraining tether 1048 from a post 1078 extending though an air bag housing 1018. If the retention member 1054 has not been released, deformation of the vent blocker 1052 may allow release of the profile restraining tether 1048.

Figure 18:
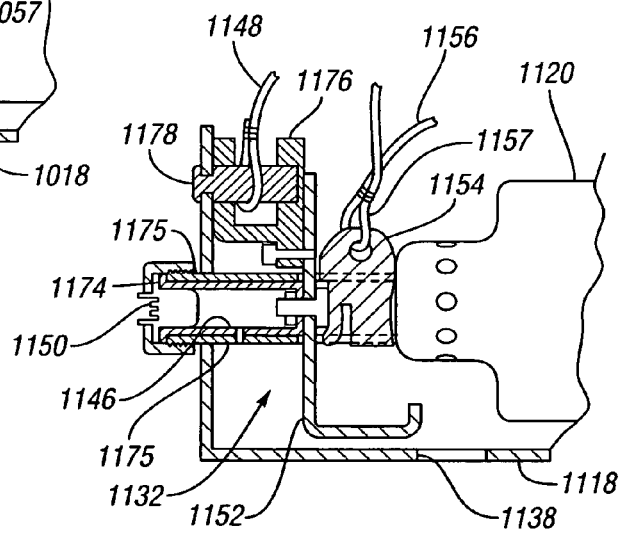
FIG. 18 is a schematic partially cross-sectional illustration of a fifth embodiment of a vent-modifying mechanism for use with an air bag system such as that of FIG. 1.

FIG. 18 shows a cross-sectional view of a fifth embodiment of a vent-modifying mechanism, generally shown at 1132. The mechanism 1132 includes an actuator 1150 extending into a pressurizable chamber 1146 at least partially defined by a plunger 1174. The actuator 1150 releases actuation fluid into the pressurizable chamber 1146 upon detection of sensed conditions. Upon actuation, pressure builds within the pressurizable chamber 1146 to move the plunger 1174 along walls 1175 from an undeployed state to a deployed state. The plunger 1174 attaches to a vent blocker 1152 movable to a second position to block a vent 1138 within an air bag housing 1118. A retention member 1154, in this case a member extending between the vent blocker 1152 and an inflator 1120, retains the vent blocker 1152 in a first position. A proximal portion 1157 of a sensing tether 1156 extends through the retention member 1154, while a distal portion (not shown) of the sensing tether 1156 attaches to an inner face of an air bag (not shown). As the air bag inflates and moves away from the mechanism 1132, the sensing tether 1156 is pulled taut. If the air bag passes the predetermined plane P of FIG. 1, the sensing tether 1156 pulls the retention member 1154 out from between the vent blocker 1152 and the inflator 1120, thereby freeing the vent blocker 1154 for movement to the second position upon actuation of the actuator 1150. The mechanism also includes a profile restraining member 1176 attached to the vent blocker 1152. If the retention member 1154 has been released, the profile restraining member 1176 will move along the vent blocker 1152, thereby releasing a profile restraining tether 1148 from a post 1178 extending through the air bag housing 1118.

FIGS. 19 and 20 show a partially cross-sectional view of a sixth embodiment of a vent-modifying mechanism, shown generally at 1232. A vent 1238 within an air bag housing 1218 allows inflation fluid to exit the air bag housing 1218 into the surrounding atmosphere, thereby affecting the inflation and deflation of an air bag. The mechanism includes a piston 1240 slidable within a piston housing 1242 from an undeployed state to a deployed state in response to sensed conditions as described with respect to the first embodiment of the mechanism 32. The piston 1240 attaches to a vent blocker 1252. The vent blocker 1252 defines a retention slot 1279, and a blocking slot 1281 extending between first and second blocking portions 1283, 1285. Prior to air bag deployment, the first blocking portion 1283 may cover at least a portion of the vent 1238, as shown in FIG. 19. A retention member 1254 extends through the vent blocker 1252 and seats within the retention slot 1279. In this embodiment, the retention member 1254 is preferably U-shaped, and retains a sensing tether 1256 routed from within the air bag housing 1218 around a post 1271. A distal portion (not shown) of the sensing tether 1256 attaches to an inner face of an air bag (not shown) as described with respect to the first embodiment of the mechanism 32. As the air bag inflates and moves away from the mechanism 1232, the sensing tether 1256 is pulled taut. If the air bag passes the predetermined plane P of FIG. 1, the sensing tether 1256 pulls the retention member 1254 out of the vent blocker 1252, thereby freeing the vent blocker 1252 for movement to a second position. That is, the vent blocker 1252 moves to the left in FIGS. 19 and 20 and stops at a stop (not shown), similar to that as described with respect to previous embodiments, such as shown in FIGS. 2 and 4. In the second position, the second blocking portion 1285 covers the vent 1238 upon actuation of an actuator.

Turning to FIG. 20, if the air bag does not pass the predetermined plane P, the retention member 1254 remains disposed through the vent blocker 1252 and the retention slot 1279. In this case, movement of the piston 1240 will also move the vent blocker 1252 toward the second position. However, movement of the vent blocker 1252 is restricted by the retention slot 1279. That is, the vent blocker 1252 moves until the retention member 1254 contacts an end of the retention slot 1279, such that the vent blocker 1252 stops in a third position. The vent blocker 1252 is preferably designed such that the when the vent blocker 1252 is in the third position, the blocking slot 1281 is directly over the vent 1238 upon contact between the retention member 1254 and the retention slot 1279 (as shown in FIG. 20), thereby maximizing inflation fluid flow out of the vent 1238. The vent blocker 1252 may include a weakened portion such that the piston 1240 will break through the vent blocker 1252 when movement of the vent blocker 1252 is impeded by the retention slot 1279. Thus, the retention slot 1279 allows adjustment of inflation fluid flow through the vent 1238 in response to deployment of the piston 1240, even when the retention member 1254 prevents complete blockage of the vent 1238.

Figure 21:
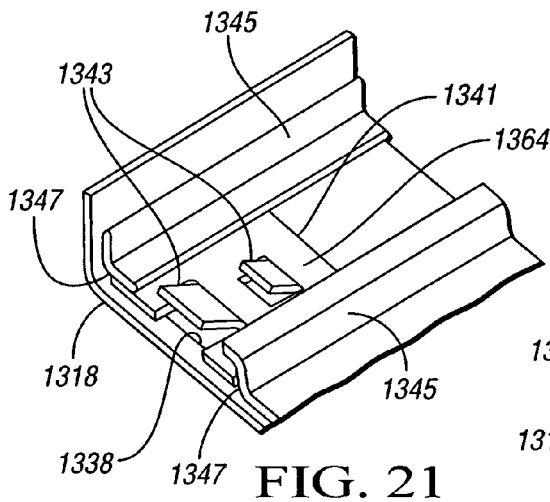
FIG. 21 is a schematic perspective view of a third embodiment of an inflation fluid responsive member shown in a restricting position.
Figure 22:
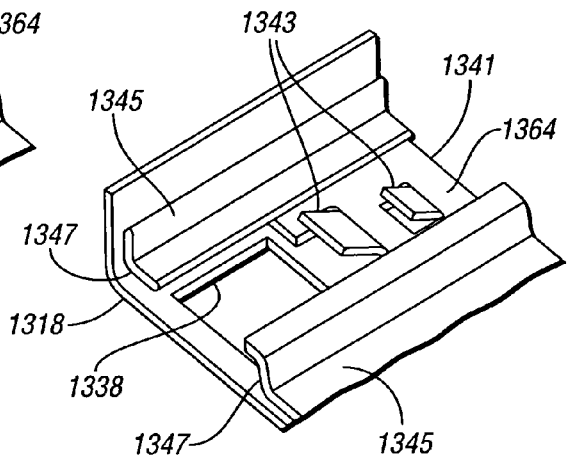
FIG. 22 is a schematic perspective view of the inflation fluid responsive member of FIG. 21 in an unrestricting position.

Referring now to FIGS. 21 and 22, a third embodiment of an inflation fluid responsive member 1364 is shown. In the third embodiment, the inflation fluid responsive member 1364 is a plate 1341 with a pair of flaps 1343 disposed thereon. The plate 1341 is preferably configured to cover a vent 1338 disposed within an air bag housing 1318, with the flaps 1343 optionally bendable with respect to the air bag housing 1318. A pair of channel members 1345 define channels 1347, with the plate 1341 being slidable within the channels 1347. The channel members 1345 may be integral with the air bag housing 1318, or they may be separate pieces. When the plate 1341 covers the vent 1338, such that the inflation fluid responsive member 1364 is in the restricting position, the flaps 1343 restrict fluid flow out of the vent 1338. Upon actuation of an inflator (not shown), inflation fluid enters the air bag housing 1318 to increase the pressure within the air bag housing 1318. If enough inflation fluid builds up within the air bag housing 1318, the inflation fluid pressure causes the plate 1341 to slide within the channels 1347 to an unrestricting position in response to the reaction of inflation fluid pressure from within the air bag housing 1318 against the flaps 1343. As shown in FIG. 22, in the unrestricting position, the vent 1338 is not covered by the plate 1341.

Figure 23A:
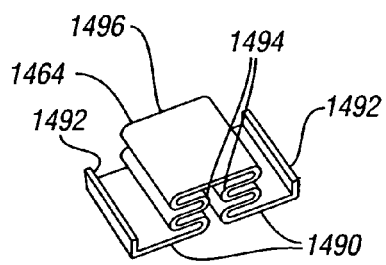
FIG. 23a is a schematic perspective view of a fourth embodiment of an inflation fluid responsive member for covering a vent.
Figure 23B:
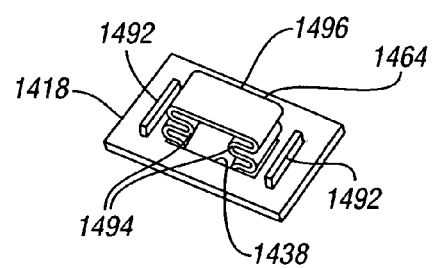
FIG. 23b is a schematic perspective view of the inflation fluid responsive member of FIG. 23a, with the inflation fluid responsive member extending through an air bag housing.
Figure 23C:
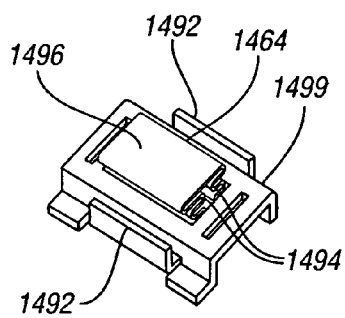
FIG. 23c is a schematic perspective view of the inflation fluid responsive member of FIG. 23a, with the inflation fluid responsive member extending through a separate piece attachable to an air bag housing.
Figure 23D:
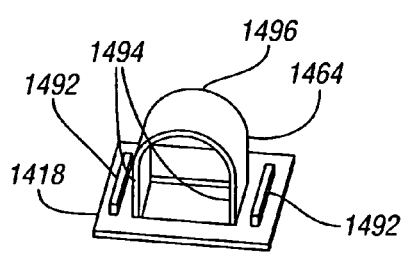
FIG. 23d is a schematic perspective view of the inflation fluid responsive member of FIG. 23b with a pair of extendable arms extended in response to fluid pressure from within the air bag housing.
Figure 23E:
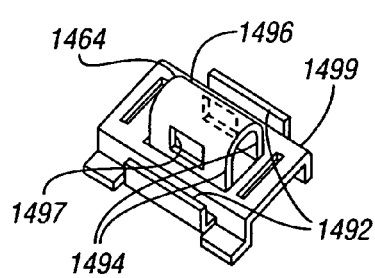
FIG. 23e is a schematic perspective view of the inflation fluid responsive member of FIG. 23c with a pair of extendable arms extended in response to fluid pressure from within the air bag housing.

FIGS. 23a through 23e present a fourth embodiment of an inflation fluid responsive member 1464. The inflation fluid responsive member 1464 includes a base 1490 having a pair of optional tabs 1492 extending therefrom, with a pair of extendable arms 1494 extending between the base 1490 and a platform 1496. As shown in FIG. 23b, the platform 1496 preferably extends through a vent 1438 within an air bag housing 1418. Specifically, the tabs 1492 extend upward through slots within the air bag housing 1418, such that the platform 1496 substantially covers the vent 1438 when the arms 1494 are not extended. Alternatively, the platform 1496 could extend through a separate piece 1499, as shown in FIG. 23c, with the separate piece being mountable over a vent within the air bag housing 1418. The inflation fluid responsive member 1464 initially restricts inflation fluid flow out of the vent 1438 since the platform 1496 substantially covers the vent 1438. Upon actuation of an inflator (not shown), inflation fluid enters the air bag housing 1418 to increase the fluid pressure therein. If enough inflation fluid builds up within the air bag housing 1418, the arms 1494 extend upward as shown in FIGS. 23d and 23e such that the platform 1496 no longer substantially covers the vent 1438, thereby increasing fluid flow through the vent 1438. As shown in FIG. 23e, the arms 1494 may include openings 1497, which weaken the arms 1494 and provide direction to exiting inflation fluid.

FIGS. 24a through 24c present a fifth embodiment of an inflation fluid responsive member 1564. The inflation fluid responsive member 1564 preferably includes at least one opening 1597 for receiving inflation fluid. For example, as shown in FIG. 24b, an opening 1597 extends completely through the inflation fluid responsive member 1564. As another example, FIG. 24c shows plurality of openings 1597 that do not extend all the way through the inflation fluid responsive member 1564. Preferably, the inflation fluid responsive member 1564 is disposed in fluid communication with a vent 1538 within an air bag housing 1518. As inflation fluid exits the air bag housing 1518 through the vent 1538, the inflation fluid enters the opening or openings 1597, and reacts thereagainst to push the inflation fluid responsive member 1564 away from the vent 1538. The opening 1597 may form an angled edge as shown in FIGS. 24a through 24c, such that inflation fluid reacts against the angled edge on the inflation fluid responsive member 1564 to move the inflation fluid responsive member 1564 away from the vent 1538.

FIG. 25 shows an air bag system incorporating the inflation fluid responsive member 1564. An air bag 1516 is housed within the air bag housing 1518. An inflator 1520 is in fluid communication with the air bag 1516. A vent blocker 1552 selectively covers the vent 1538 within the air bag housing 1518, as discussed with respect to previous embodiments of the present invention, by selectively preventing inflation fluid flow through a secondary vent 1598. The inflation fluid responsive member 1564 is preferably disposed between the vent 1538 and the vent blocker 1552. However, the inflation fluid responsive member 1564 may be located elsewhere with respect to the air bag housing 1518. For example, the inflation fluid responsive member 1564 may be disposed through slot 1595. If the vent blocker 1552 is covering the secondary vent 1598, inflation fluid will not subsequently escape the air bag housing 1518 through the vent 1538, resulting in maximum inflation of the air bag 1516 upon actuation of the inflator 1520. If the vent blocker 1552 has been removed from in front of the secondary vent 1598, inflation fluid may pass therethrough. If the inflation fluid responsive member 1564 is in a restricting position, that is, blocking the vent 1538, inflation fluid may only pass to the outside environment through the opening 1597, or through small spaces between the inflation fluid responsive member 1564 and the vent 1538. However, if the inflation fluid builds sufficient pressure, or as a direct response to inflation fluid reacting upon the opening 1597, the inflation fluid pressure displaces the inflation fluid responsive member 1564 to an unrestricting position, shown in phantom in FIG. 25. Once the inflation fluid responsive member 1564 has been removed, the inflation fluid is free to pass through the vent 1538. Note that in the embodiment shown, the inflation fluid responsive member 1564 can only move to the unrestricting position if air bag deployment has opened an air bag cover 1567 as known in the art. In fact, the air bag cover 1567 may attach directly to the inflation fluid responsive member 1564, such that as the air bag cover 1567 opens, the inflation fluid responsive member 1564 moves from the restricting position to the unrestricting position. Additionally, a tether 1569 may attach the inflation fluid responsive member 1564 to the air bag 1516, as shown in phantom in FIG. 25, such that inflation of the air bag 1516 pulls the tether 1569 to pull the inflation fluid responsive member 1564 out of the restricting position. The air bag cover 1567 or the air bag 1516 may also tether the inflation fluid responsive member 1564 to prevent damage to the vehicle interior following movement to the unrestricting position.

Referring back to FIGS. 1 through 4, assembly of the mechanism 32 will now be described with respect to the first embodiment of the present invention. The distal portion 58 of the sensing tether 56 is attached to an inner face of the air bag 16. The vent blocker 52 is attached to the piston 40, preferably through an opening in the vent blocker 52 (as shown in more detail in FIGS. 5b through 5g). The actuator 50 is then inserted into the pressurizable chamber 46. The piston 40 is inserted into the piston housing 42 until the vent blocker 52 reaches the first position. The proximal portion 57 of the sensing tether 56 is next engaged with the retention member 54. The proximal portion 57 may be attached directly to the retention member 54, or alternatively, the proximal portion 57 may be routed beneath the retention member 54. The retention member 54 is then inserted to retain the vent blocker 52 in the first position. The air bag 16 is attached to the air bag housing 18. The sensor 53 is then attached to the retention member 54.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. An air bag system comprising:
   an inflator operable to release inflation fluid;
   an inflatable air bag, said air bag being inflatable upon release of inflation fluid from said inflator;
   an air bag housing substantially surrounding said air bag, said housing having a vent for venting inflation fluid released by said inflator;
   a vent-modifying mechanism operatively connected to said housing, said mechanism comprising:
      a vent blocker movable from a first position to a second position to adjust inflation fluid flow through said vent; and
      a retention member operable to retain said vent blocker in said first position;
      a movable member at least partially defining a pressurizable chamber; and
      an actuator operable to selectively release actuation fluid into said pressurizable chamber, thereby pressurizing said pressurizable chamber to move said movable member from an undeployed state to a deployed state; and
   a flexible sensing tether extending between said air bag and said retention member, said sensing tether operable to release said retention member to permit movement of said vent blocker from said first position to said second position.

2. The air bag system of claim 1, wherein said movable member attaches to said vent blocker, such that movement of said movable member moves said vent blocker when said retention member is released.

3. The air bag system of claim 1, wherein said vent blocker includes a weakened portion, and wherein said movable member breaks through said weakened portion of said vent blocker during movement of said movable member from said unemployed state to said deployed state when said retention member retains said vent blocker in said first position.

4. The air bag system of claim 1, wherein said vent blocker substantially blocks said vent in said second position, and wherein said vent is substantially unblocked when said vent blocker is in said first position.

5. The air bag system of claim 1, wherein said vent blocker substantially blocks said vent in said first position, and wherein said vent is substantially unblocked when said vent blocker is in said second position.

6. The air bag system of claim 1, wherein said sensing tether includes a proximal portion attached to said retention member and a distal portion attached to said air bag, such that said sensing tether releases said retention member when said air bag passes a predetermined plane.

7. The air bag system of claim 1, wherein said vent blocker is movable from said first position to a third position, said third position being intermediate to said first and second positions.

8. A vent-modifying mechanism for a vehicle air bag system comprising:
   an actuator operable to release actuation fluid;
   a vent blocker movable from a first position to a second position;
   a retention member operable to retain said vent blocker in said first position, said retention member being releasable by tether elements attached to an inflatable air bag, wherein inflation of said inflatable air bag releases said retention member to thereby allow said vent blocker to move from said first position to said second position in response to release of actuation fluid by said actuator; and
   a movable member at least partially defining a pressurizable chamber, said actuator extending into said pressurizable chamber and operable to selectively release actuation fluid into said pressurizable chamber.

9. A vent-modifying mechanism for a vehicle air bag system comprising:
   an actuator operable to release actuation fluid;
   a vent blocker movable from a first position to a second position;
   a retention member operable to retain said vent blocker in said first position, said retention member being releasable by tether elements attached to an inflatable air bag, thereby allowing said vent blocker to move from said first position to said second position in response to release of actuation fluid by said actuator; and
   a movable member at least partially defining a pressurizable chamber, said actuator extending into said pressurizable chamber and operable to selectively release actuation fluid into said pressurizable chamber.

10. The vent-modifying mechanism of claim 9, wherein release of actuation fluid by said actuator increases fluid pressure within said pressurizable chamber to move said movable member from an unemployed state to a deployed state.

11. The vent-modifying mechanism of claim 10, wherein said movable member attaches to said vent blocker, such that movement of said movable member from said unemployed state to said deployed state moves said vent blocker from said first position to said second position when said retention member is released.

12. The air bag system of claim 10, wherein said vent blocker includes a weakened portion, and wherein said movable member breaks through said weakened portion of said vent blocker during movement of said movable member from said undeployed state to said deployed state while said retention member retains said vent blocker in said first position.

13. The air bag system of claim 10, wherein said vent blocker prevents movement of said movable member from said unemployed state to said deployed state when said retention member retains said vent blocker in said first position.

* * * * *